(12) United States Patent
Jaekel

(10) Patent No.: US 6,543,266 B1
(45) Date of Patent: Apr. 8, 2003

(54) HYDROFORMED COLLAPSIBLE DRIVESHAFT AND STEERING SHAFT AND METHODS OF MAKING THE SAME

(75) Inventor: Federico G. Jaekel, Richmond Hill (CA)

(73) Assignee: Magna International Inc., Aurora (CA)

( * ) Notice: Subject to any disclaimer, the term of this patent is extended or adjusted under 35 U.S.C. 154(b) by 175 days.

(21) Appl. No.: 09/639,116

(22) Filed: Aug. 16, 2000

Related U.S. Application Data

(60) Provisional application No. 60/150,353, filed on Aug. 24, 1999.

(51) Int. Cl.[7] .............................. B21D 22/10; F16C 3/03
(52) U.S. Cl. ............................. 72/61; 72/58; 464/162; 464/183; 464/180
(58) Field of Search ................................ 464/162, 183, 464/158, 180, 182; 72/61, 62, 58; 29/397.2; 74/492

(56) References Cited

U.S. PATENT DOCUMENTS

| | | | |
|---|---|---|---|
| 2,734,473 A | 2/1956 | Reynolds ..................... 113/44 |
| 3,599,757 A | 8/1971 | Takamatsu et al. ......... 188/1 C |
| 3,699,824 A | * 10/1972 | Staudenmayer .............. 74/492 |
| 4,293,995 A | 10/1981 | Jordan ...................... 29/421 R |
| 4,590,655 A | 5/1986 | Javorik ......................... 29/421 |
| 4,660,269 A | 4/1987 | Suzuki ......................... 29/523 |
| 4,751,835 A | 6/1988 | Galaniuk et al. ............... 72/62 |
| 4,991,871 A | * 2/1991 | Sadakata ...................... 74/492 |
| 5,228,720 A | 7/1993 | Sato et al. .................. 280/777 |
| 5,415,021 A | 5/1995 | Folmer ........................... 72/58 |
| 5,464,251 A | 11/1995 | Castellon .................... 280/777 |
| 5,476,284 A | 12/1995 | Durocher et al. ........... 280/777 |
| 5,575,502 A | 11/1996 | Oppitz et al. ............... 280/689 |
| 5,580,314 A | 12/1996 | Moriyama et al. .......... 464/162 |
| 5,601,165 A | 2/1997 | Oppitz et al. ............... 188/296 |
| 5,618,058 A | * 4/1997 | Byon ........................... 74/492 |
| 5,632,502 A | 5/1997 | Oppitz et al. ............... 280/689 |
| 5,700,027 A | 12/1997 | Schiffler .................... 280/723 |
| 5,819,408 A | 10/1998 | Catlin ....................... 29/897.2 |
| 5,823,031 A | 10/1998 | Campbell et al. .............. 72/58 |
| 5,902,186 A | 5/1999 | Gaukel ....................... 464/162 |
| 5,946,977 A | * 9/1999 | Sato et al. .................. 464/134 |
| 5,971,444 A | 10/1999 | Hawkins .................... 285/206 |
| 5,983,497 A | * 11/1999 | Breese et al. ............... 464/180 |
| 6,193,612 B1 | * 2/2001 | Craig et al. ................ 464/162 |
| 6,254,488 B1 | * 7/2001 | Hill ............................. 464/180 |
| 6,368,225 B1 | * 4/2002 | Breese et al. ............... 464/183 |

\* cited by examiner

*Primary Examiner*—David Jones
(74) *Attorney, Agent, or Firm*—Pillsbury Winthrop LLP

(57) ABSTRACT

A collapsible driveshaft and method of making the same. The collapsible driveshaft includes a tubular member having first and second portions that are integrally formed as a one-piece member. The first portion has splines formed on an exterior surface thereof. The second, opposite portion has both outer and inner diameters that are greater than the outer diameter of the first portion. The method includes placing a tubular metal blank into a hydroforming die having a die cavity and expanding the blank by pressurizing the interior of the blank with hydroforming fluid. During the hydroforming process, the first portion of the blank is expanded to form splines while the second portion is expanded to form inner and outer diameters that are greater than the outer diameter of the first portion.

15 Claims, 3 Drawing Sheets

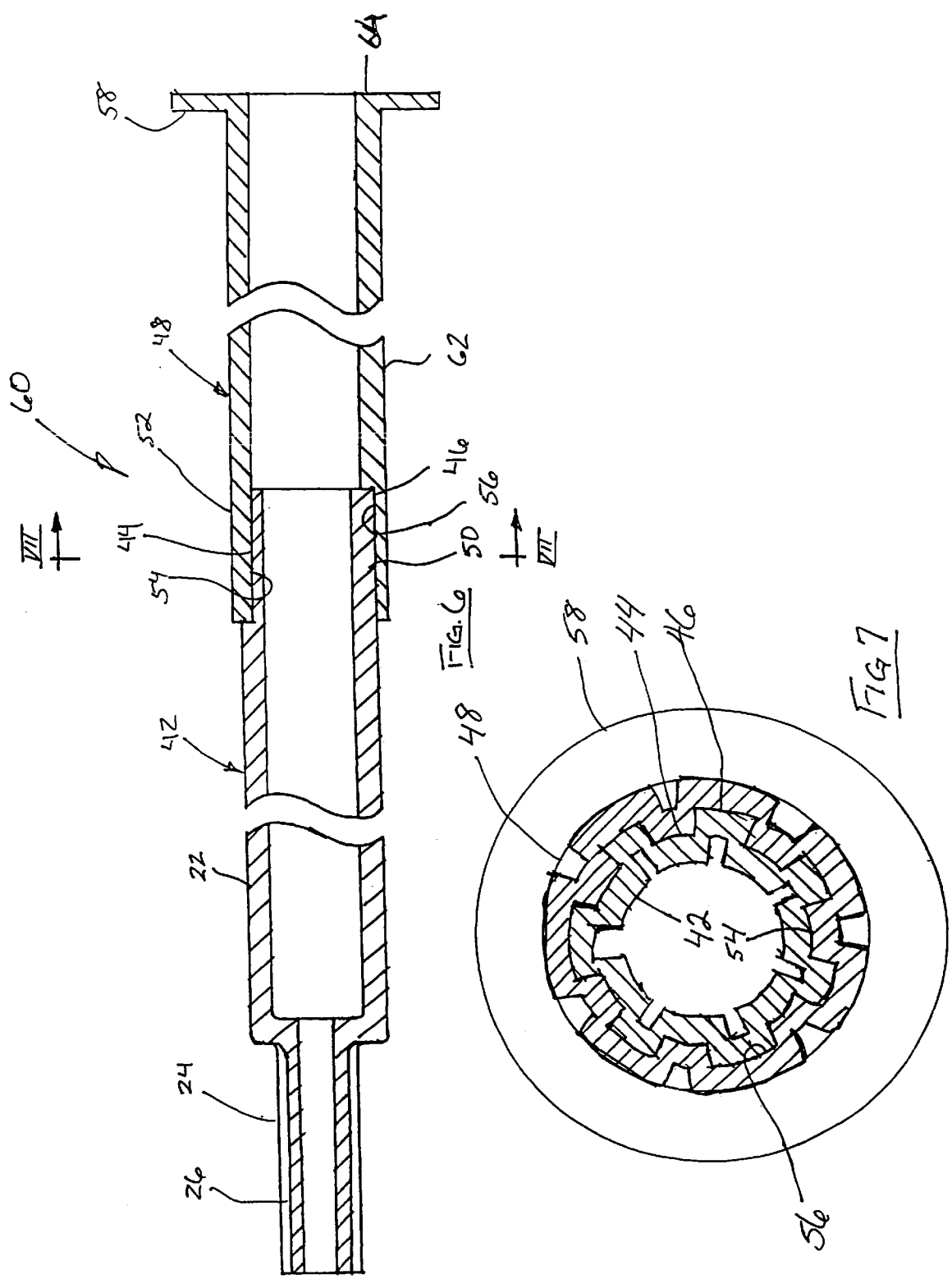

HYDROFORMED COLLAPSIBLE DRIVESHAFT AND STEERING SHAFT AND METHODS OF MAKING THE SAME

This application claims the benefit of U.S. Provisional Application No. 60/150,353 filed on Aug. 24, 1999, which is incorporated herein by reference.

BACKGROUND OF THE INVENTION

During a vehicle collision, torque-transmitting shafts within the vehicle, such as the drive shaft or steering shaft, can pose a danger to occupants if an axial collision force applied to the shaft breaks the shaft free from its mountings and drives the shaft into the passenger compartment. To reduce the potential danger posed by such components, shafts have been constructed so as to be collapsible in an axial direction by plastic deformation of the shaft upon application of an axial force of sufficient magnitude. In general, the shaft is formed with one or more regions of reduced axial strength, so that the shaft will collapse in a controlled and predictable manner at such regions.

Hydroforming of vehicle components is conventionally known to those skilled in the art. In the hydroforming process, a blank, typically a piece of elongated, tubular metal stock, is placed in a hydroforming die having die surfaces with shapes and features corresponding to those desired of the finished component. Both ends of the blank are sealed, and hydroforming fluid is injected into the blank under pressure, thereby expanding the blank into conformity with the die surfaces. Hydroforming methods are described in U.S. Pat. Nos. 5,107,693, 5,233,854, 5,333,775, 4,567,743, 5,070,717, 5,239,852 and 5,339,667, the disclosures of which are hereby incorporated by reference as preferred methods by which hydroforming in accordance with the present invention may be accomplished.

Hydroforming is an advantageous method for forming metal vehicle components, because the process is efficient and economical and produces repeatable accuracy in the components formed. The prior art has not, however, suggested a process for hydroforming a collapsible shaft having torque transmitting splines, wherein the splined portion of the shaft has an outer diameter that is smaller than an inner diameter of an adjacent portion of the shaft, so that the splined portion can deform into the adjacent portion when the shaft is subjected to an axial force of sufficient magnitude.

SUMMARY OF THE INVENTION

It is an object of the present invention to provide a hydroformed collapsible shaft and a method for hydroforming a collapsible shaft. The invention, in one form, includes a method of forming a collapsible driveshaft comprising the steps of placing a tubular metal blank into a hydroforming die having a die cavity and expanding the tubular metal blank by sealing opposite ends of said blank and pressurizing an interior of the blank with hydroforming fluid. A first portion of the blank is expanded to a first outer diameter and is engaged with surfaces of the die cavity defining splines so that splines are formed on the first portion. A second portion of the blank is expanded to a second outer diameter and an inner diameter which are both greater than the first outer diameter of the first portion.

The invention, in another form, includes a method of forming a collapsible driveshaft. A first tubular metal blank is placed into a first hydroforming die having a first die cavity. The first tubular metal blank is expanded into conformity with surfaces of the first die cavity by sealing opposite ends of the first tubular metal blank and pressurizing an interior of the first tubular metal blank with hydroforming fluid to form a first hydroformed member having splines on an exterior surface of one end portion thereof and a first connecting portion on an opposite end portion thereof.

A second tubular metal blank is placed into a second hydroforming die having a second die cavity. The second tubular metal blank is expanded into conformity with surfaces of the second die cavity by sealing opposite ends of the second tubular metal blank and pressurizing an interior of the second tubular metal blank with hydroforming fluid to form a second hydroformed member having connecting portion on one end portion thereof. The second connecting portion is cooperatively engageable with the first connecting portion of the first hydroformed member.

The first connecting portion of the first hydroformed member is engaged with the second connecting portion of the second hydroformed member so as to couple the first and second hydroformed members together so that rotation of one of the hydroformed members about a longitudinal axis thereof translates into rotation of the other of the hydroformed members.

Other objects, features, and characteristics of the present invention, as well as the methods of operation of the invention and the function and interrelation of the elements of structure, will become more apparent upon consideration of the following description and the appended claims with reference to the accompanying drawings, all of which form a part of this disclosure, wherein like reference numerals designate corresponding parts in the various figures.

BRIEF DESCRIPTION OF THE DRAWINGS

FIG. 6 is a cross-section of a collapsible shaft assembly; and

FIG. 7 is transverse cross-section along the line VII—VII in FIG. 6.

DETAILED DESCRIPTION OF THE INVENTION

Figure 1:
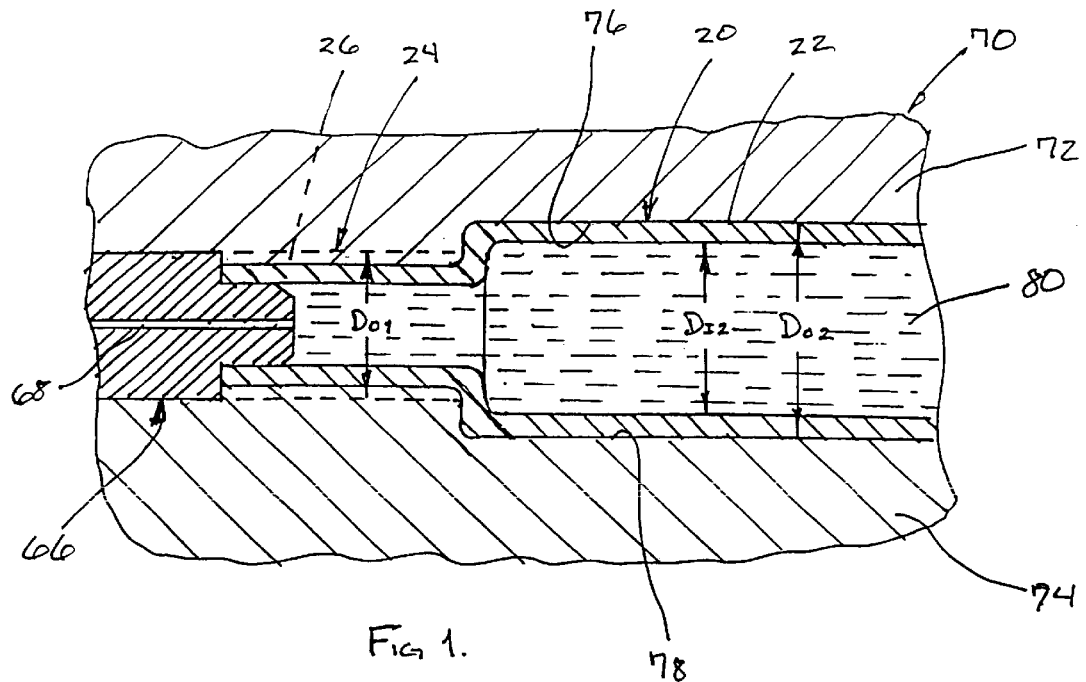
FIG. 1 is a partial cross-section showing a collapsible, splined hydroformed member being formed in a hydroforming die.

FIG. 1 shows a portion of a collapsible hydroformed member, generally indicated by reference number 20, disposed within a hydroforming die 70. The hydroforming die 70 includes an upper die portion 72 having an upper die surface 76 and a lower die portion 74 having a lower die surface 78. A tubular metal blank formed from a plastically deformable material, preferably steel, is placed inside the die 70, and the upper die 72 and lower die 74 are brought into engagement with each other so that the upper die surface 76 and lower die surface 78 define an enclosed die cavity. A hydroforming port 66 is inserted into a first end of the tubular metal blank, thereby sealing the first end of the blank, and the opposite end of the blank is sealed as well by a second hydroforming port (not shown). Fluid is injected through a central conduit 68 formed in the hydroforming port 66 to introduce the pressurized fluid 80 into the interior of the tubular metal blank to expand the metal blank into conformity with the upper and lower surfaces 76,78.

The resulting hydroformed member 20 includes a first portion 24 having a series of splines 26 formed about the peripheral outer surface thereof and defining a first portion maximum outer diameter designated $D_{O1}$. The splines 26 of the first portion 24 accommodate the installation of a torque transmitting member, such as a gear or pulley, onto the first end 24 of the hydroformed member 20.

The hydroformed member 20 further includes a second portion 22 having a second portion minimum outer diameter $D_{O2}$ and a second portion minimum inner diameter $D_{I2}$. First portion 24 and second portion 22 are preferably arranged so as to be substantially coaxial with each other. The second portion minimum inner diameter $D_{I2}$ is greater than the first portion maximum outer diameter $D_{O1}$. Although the second portion 22 of the hydroformed member 20 is shown to have a constant cross-sectional diameter along its length, it is not necessary to the proper functioning of the present invention that this be the case. It is necessary, however, that, in the vicinity of the first portion 24, the second portion minimum inner diameter $D_{I2}$ be greater than the first portion maximum outer diameter $D_{O1}$ as will be explained in fuller detail below.

Figure 3:
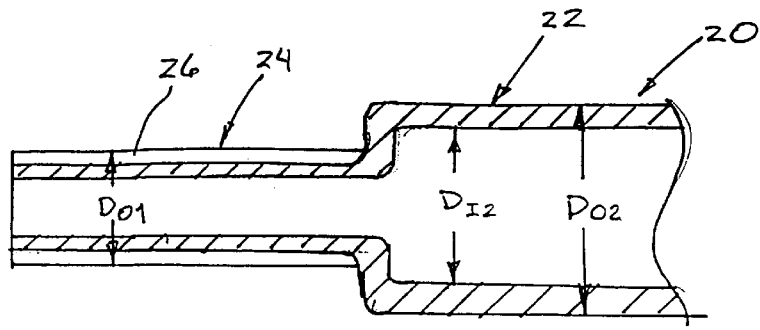
FIG. 3 is a cross-section showing a splined end of a collapsible hydroformed member.
Figure 4:
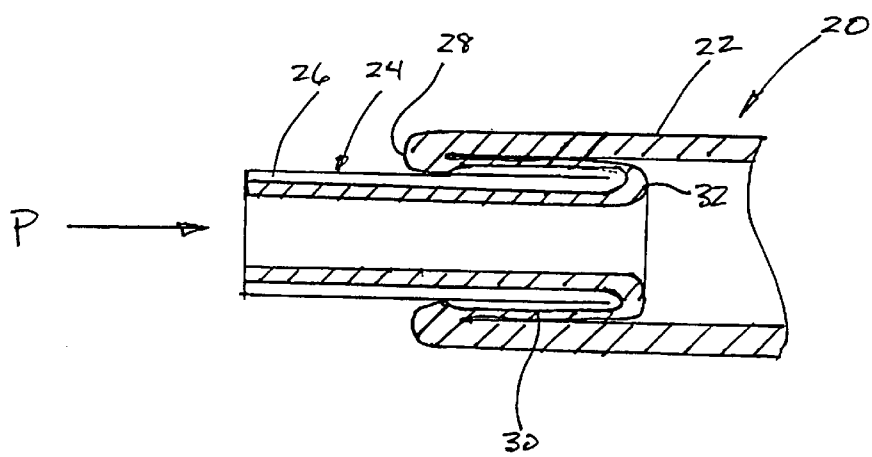
FIG. 4 is a cross-section showing the splined end of the collapsible hydroformed member collapsed into an intermediate portion of the member.

The manner in which the first portion 24 of the collapsible hydroformed member 20 is constructed and arranged so as to be collapsible with respect to the second portion 22 is shown in FIGS. 3 and 4. During a vehicle collision, an axial force, represented by the arrow P, can be applied to the steering and/or drive shaft of the vehicle. If the axial force P is of sufficient magnitude, the hydroformed member 20 will plastically deform as the fist portion 24 is plastically forced into the second portion 22, thereby forming a first fold 28, an intermediate portion 30 having an intermediate diameter between $D_{I2}$ and $D_{O1}$, and a second fold 32. Plastic deformation of the member 20 absorbs a portion of the energy of the force P. Because the inner diameter $D_{I2}$ of the second portion 22 is greater than the outer diameter $D_{O1}$ of the first portion 24, first portion 24 can deform into the second portion 22.

Figure 5:
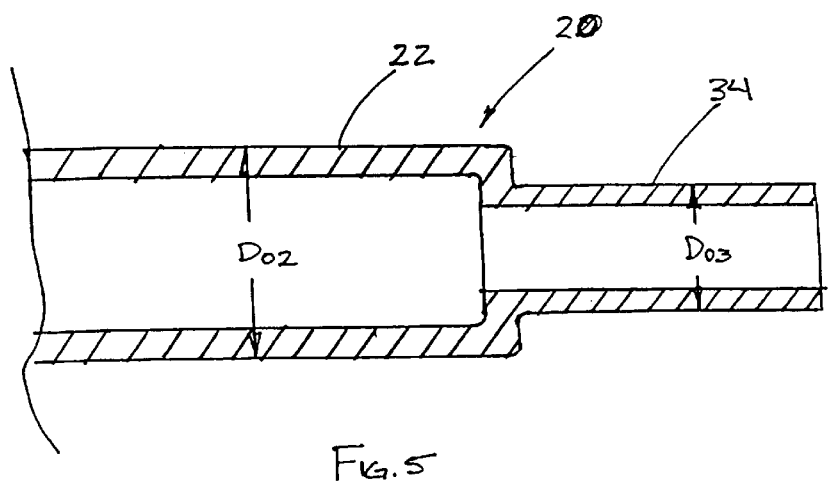
FIG. 5 is a cross-section showing a hydroformed member having an intermediate portion and an end portion having an outside diameter smaller than that of the intermediate portion.

As shown in FIG. 5, the hydroformed member 20 may be formed so as to include a third portion 34 with an outer diameter $D_{O3}$. Diameter $D_{O3}$ is less than outer diameter $D_{O2}$ of the second portion 22 and may be less than inner diameter $D_{I2}$ of the second portion 22, so that third portion 34 will be collapsible into second portion 22 upon application of a sufficient axial force to the member 20. This third portion 34 may be connected with a universal joint in any conventional fashion.

Figure 2:
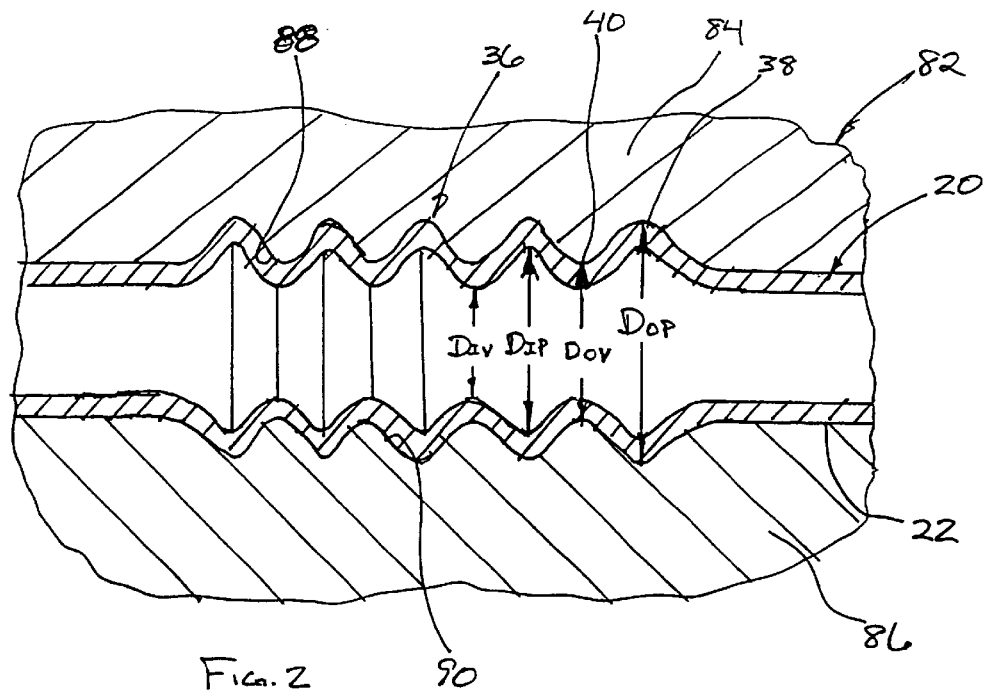
FIG. 2 is a cross-section showing a variable diameter portion of a collapsible hydroformed member disposed in a hydroforming die.

As shown in FIG. 2, a portion of the hydroformed member 20 may include a region 36 of varying cross-sectional diameters, or crenulations, comprising a series of alternating peaks 38 and valleys 40. The peaks 38 define a peak outer diameter $D_{OP}$ and a peak inner diameter $D_{IP}$, and the valleys 40 define a valley outer diameter $D_{OV}$ and a valley inner diameter $D_{IV}$. The hydroformed member 20 is shown disposed in a hydroforming die 82 including an upper die 84 having an upper die surface 88 and a lower die 86 having a lower die surface 90. The region 36 of varying cross-sectional diameters can be formed, such as described above, by sealing both ends of a tubular metal blank disposed within the die cavity defined by the upper and lower die surfaces 88, 90 and introducing a hydroforming fluid under pressure to expand the tubular metal blank into conformity with the die surfaces.

It can be appreciated that the bellows-like shape of the region 36 facilitates axial plastic deformation of the hydroformed member 20 upon the application of an axial compressive force of sufficient magnitude, thereby absorbing a portion of the energy of the axial force.

A steering shaft assembly including a cylinder having a region of crenulations formed by hydroforming is described in U.S. Pat. No. 5,902,186, the disclosure of which is hereby incorporated by reference.

A collapsible drive shaft or steering shaft assembly is designated generally by reference number 60 in FIG. 6. The assembly 60 comprises a firsts hydroformed member 42 having a first end 24 formed with splines 26 and an intermediate, or second, portion 22, whereby the minimum inner diameter of the portion 22 is greater than the maximum outer diameter of the portion 24, as described above. Although not shown in FIG. 6, the intermediate portion 22 may include one or more regions of varying diameters, such as shown in FIG. 2 and described above. A second end 50 of the first hydroforming member 42 has a first connecting portion formed thereon which preferably comprises alternating longitudinal ribs 46 and longitudinal grooves 44 (see FIG. 7). The first hydroformed member 42 is formed by placing a tubular metal blank into the die cavity of a hydroforming die, sealing opposite ends of the tubular metal blank, and injecting a hydroforming fluid under pressure to expand the tubular metal blank into conformity with the surfaces of the die cavity so as to form the hydroformed member shown in FIG. 6.

The second hydroformed member 48 includes a first end 52 having a second connecting portion formed thereat. The second connecting portion preferably comprises alternating longitudinal ribs 54 and longitudinal grooves 56. As shown in FIGS. 6 and 7, the first and second connecting portions are preferably cooperatively engageable with each other. In the illustrated embodiment, the ribs 46 and grooves 44 of the first hydroformed member 42 interlock with the grooves 56 and ribs 54, respectively, of the second hydroformed member 48, so that rotation of one of the hydroformed members 42 or 48 about its respective longitudinal axis is transmitted to the other hydroformed member.

The second hydroformed member 48 also includes an intermediate portion 62, which may include one or more regions of varying diameters such as shown in FIG. 2 and described above. A second end 64 of the second hydroformed member 48 may include a coupling structure, such as the coupling flange 58, for coupling the second hydroformed member 48, and thereby the shaft assembly 60, to an adjacent rotating mechanism, such as a U-joint or steering mechanism.

The second hydroformed member 48 is formed by placing a second tubular metal blank into the die cavity of a second hydroforming die and expanding the second tubular metal blank into conformity with the surfaces of the second die cavity by sealing opposite ends of the second tubular metal blank and pressurizing the interior of the second tubular metal blank with hydroforming fluid to form the second hydroforming member 48 shown in FIG. 6. The coupling flange 58 shown in FIG. 6 is preferably a post-hydroforming structure and may be formed employing spinning technology, as is generally known in the art.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

What is claimed is:

1. A collapsible driveshaft, comprising:
   an integrally formed tubular member; said tubular member having a first portion having splines formed on an exterior surface thereof, said first portion having a first outer diameter, said tubular member having a second portion having a second outer diameter and an inner diameter, both of which are greater than said first outer diameter, said second portion being constructed and arranged to plastically deform such that said first portion can be forced with sufficient force into said second portion such that said splines would be positioned within said second portion.

2. A collapsible driveshaft according to claim 1, wherein said second portion comprises a region of varying cross-sectional diameters that define discreet areas of longitudinal weakness in said driveshaft.

3. A collapsible driveshaft according to claim 1, wherein said tubular member is a one-piece, unitary member.

4. A collapsible driveshaft according to claim 1, wherein said first and second portions of said tubular member are coaxial along an axis, and said second portion includes a connecting section for connecting said second portion with said first portion, said connection section radially extending from said first portion and being substantially perpendicular to said axis.

5. A collapsible driveshaft according to claim 1, wherein said second portion is constructed and arranged such that after deformation, said second portion includes a first fold between an undeformed section of said second portion and a deformed, intermediate section of said section portion and a second fold between said intermediate section and said first portion.

6. A collapsible driveshaft according to claim 5, wherein said first and second portions of said tubular member are coaxial along an axis, and said second portion is constructed and arranged such that after deformation, said intermediate section is positioned between said undeformed section of said second portion and said first portion along a line extending radially from said axis.

7. A collapsible driveshaft, comprising:

an integrally formed tubular member; said tubular member having a first portion having splines formed on an exterior surface thereof, said first portion having a first outer diameter, said tubular member having a second portion having a second outer diameter and an inner diameter, both of which are greater than said first outer diameter, said first and second portions of said tubular member being coaxial along an axis, and said second portion including a connecting section for connecting said second portion with said first portion, said connection section radially extending from said first portion and being substantially perpendicular to said axis.

8. A collapsible driveshaft according to claim 7, wherein said tubular member is a one-piece, unitary member.

9. A collapsible driveshaft, comprising:

an integrally formed tubular member; said tubular member having a first portion having splines formed on an exterior surface thereof, said first portion having a first outer diameter, said tubular member having a second portion having a second outer diameter and an inner diameter, both of which are greater than said first outer diameter, said second portion having a first end and a second end, which is opposite to said first end, said second portion being attached to said first portion at said first end of said second portion, and said tubular member having a third portion attached to said second end of said second portion, said third portion having an outer diameter that is less than said inner diameter of said second portion and said third portion being constructed and arranged to be forced into said second portion.

10. A collapsible driveshaft according to claim 9, wherein said tubular member is a one-piece, unitary member.

11. A collapsible driveshaft according to claim 9, wherein said first and second portions of said tubular member are coaxial along an axis, said second portion includes a first connecting section for connecting said second portion with said first portion, said first connection section radially extending from said first portion and being substantially perpendicular to said axis, and said second portion further includes a second connecting section for connecting said second portion with said third portion, said second connection section radially extending from said third portion and being substantially perpendicular to said axis.

12. A collapsible driveshaft, comprising:

an integrally formed tubular member; said tubular member having a first portion having splines formed on an exterior surface thereof, said first portion having a first outer diameter, said tubular member having a second portion having an annular wall with a second outer diameter and an inner diameter, both of which are greater than said first outer diameter, said second portion having a bellows section with multiple peaks and valleys in said annular wall of the second portion, said bellows section being positioned between two tubular sections of said second portion that have substantially similar outer diameters.

13. A collapsible driveshaft according to claim 12, wherein said tubular member is a one-piece, unitary member.

14. A collapsible driveshaft according to claim 12, wherein said bellows section includes at least two annular bulges that are positioned between an annular valley, with each of said at least two annular bulges having an outer diameter that is greater than said outer diameter of each of said two tubular sections of said second portion, and said annular valley having an outer diameter that is less than said outer diameter of each of said at least two annular bulges.

15. A collapsible driveshaft according to claim 14, wherein said at least two annular bulges comprises three annular bulges, with each of said three annular bulges being separated from an adjacent annular bulge by one annular valley.

* * * * *